A. L. SCHWARTZBERG.
CAN PUNCTURER.
APPLICATION FILED MAY 23, 1919.
1,315,339. Patented Sept. 9, 1919.
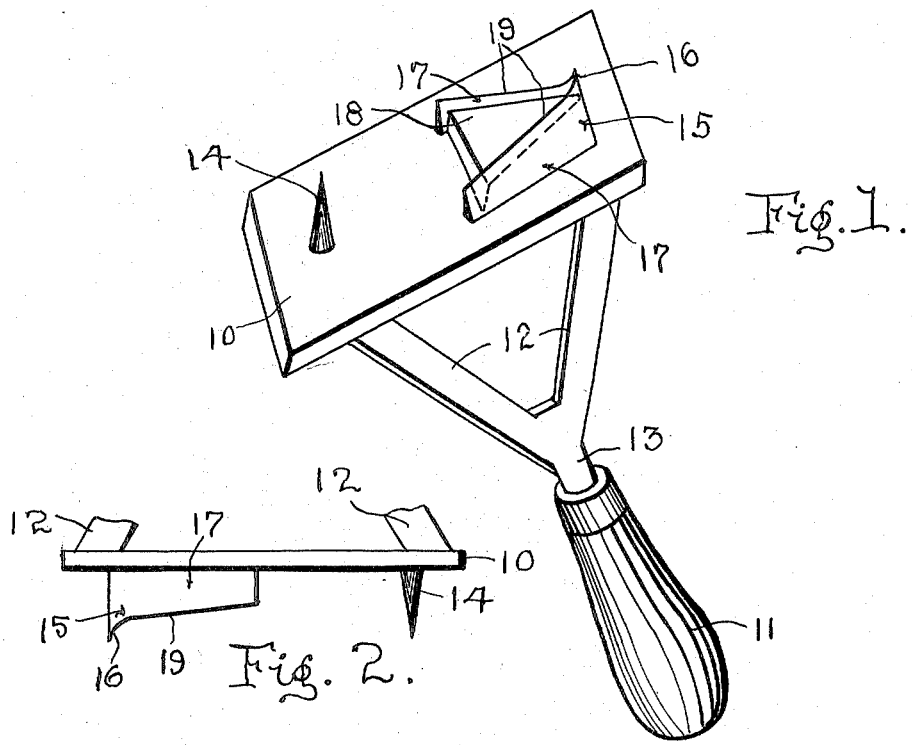
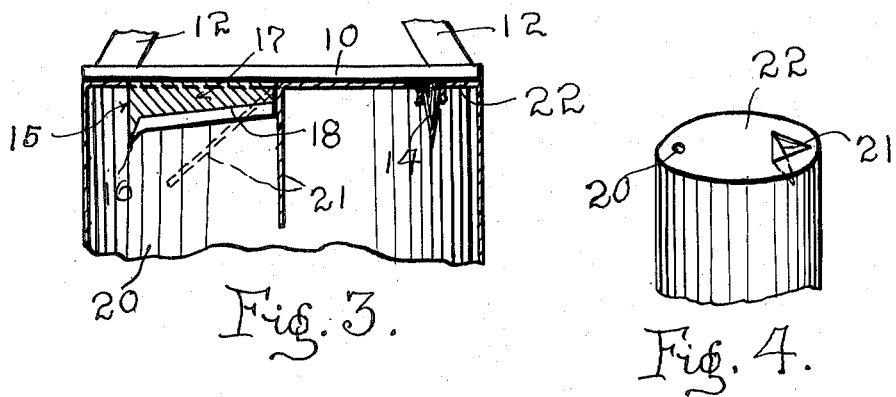
Inventor
Alter I. Schwartzberg
By Chandler & Chandler
Attorneys

UNITED STATES PATENT OFFICE.

ALTER L. SCHWARTZBERG, OF SHREVEPORT, LOUISIANA.

CAN-PUNCTURER.

1,315,339.

Specification of Letters Patent.  Patented Sept. 9, 1919.

Application filed May 23, 1919. Serial No. 299,241.

*To all whom it may concern:*

Be it known that I, ALTER L. SCHWARTZBERG, a citizen of the United States, residing at Shreveport, in the parish of Caddo, State of Louisiana, have invented certain new and useful Improvements in Can-Puncturers; and I do hereby declare the following to be a full, clear, and exact description of the invention, such as will enable others skilled in the art to which it appertains to make and use the same.

This invention has reference to culinary or kitchen utensils, and more particularly to an improved device for puncturing a can, so as to provide a pouring opening or spout and an air inlet opening, so as to facilitate the pouring of the contents of cans containing milk, such as evaporated milk, soup or the like and so that the entire contents can be emptied from the can.

A further object of the invention is to provide a can puncturer which embodies in a simple tool or utensil, means for producing an air inlet opening and also for cutting a triangular opening at a point diametrically opposite the inlet opening for air, and for bending down the tongue or flap at the opening to permit the escape of the contents of the can when being poured, the puncturing being accomplished with a single operation and obviating the necessity of driving holes in the can with a nail or the like, as is now commonly done with the objections incident thereto in connection with the fact that the entire contents cannot be poured.

A further object of the invention is to provide a simple tool of the above character which can be very readily and economically produced, and which is not only strong and durable, but which can carry out the operations specified, in a quick and efficient manner.

With the above objects and others in view, as will appear, as the specification proceeds, the invention comprises certain novel combinations and arrangements of parts, as will be hereinafter more particularly pointed out and claimed.

Reference is had to the accompanying drawings forming a part of this application, wherein like reference characters designate corresponding parts throughout the several views, and wherein:

Figure 1 is a perspective view of my improved can puncturer, looking toward the bottom thereof;

Fig. 2 is a fragmentary side elevation;

Fig. 3 is a fragmentary longitudinal section showing the use of the device, and

Fig. 4 is a detail view of a can, showing the manner in which the same is punctured by the improved tool or utensil.

At present, it is common to puncture a can containing evaporated milk or the like, by piercing the top or one end thereof with a nail or like pointed instrument, near diametrically opposite sides of the can, so as to provide an inlet opening for air and an outlet for the contents. However, this is objectional owing to the liability of contamination and also owing to the fact that the contents cannot be entirely emptied. The openings also become clogged up with the contents and must be cleaned in order to permit further use, while the old way of puncturing requires two operations.

The present invention is designed to overcome the above difficulties and to puncture the can in a single operation.

For this purpose, there is shown in the accompanying drawings, the preferred embodiment of the invention, wherein it will be seen that the device comprises a plate 10 preferably of rectangular outline and slightly elongated. To the plate 10, there is secured a handle 11 preferably through the medium of an inverted V-shaped attaching member or fork 12, secured to or formed with the plate in any preferred manner, and provided with a shank 13 for securing the handle 11 thereto.

Projecting from the face of the plate 10 opposite to the handle is a conical or tapered pin or projection 14, the same extending at right angles to the plate so as to puncture the can end or top to form an air inlet opening or vent.

Projecting from the same face of the plate 10 in spaced relation to the piercing member 14 and adjacent its opposite end, is a relatively V-shaped blade 15 having at the apex thereof located adjacent to the end remote from the piercing member 14, a protruding and V-shaped pointed blade part 16, while the sides 17 slope therefrom toward the piercing member 14, so as to be of less height at the ends thereof remote from the piercing member or point 16 than at the end which initially starts the cut. Positioned between the sides 17 is a similarly inclined or sloping raised part or intermediate wall 18 projecting from the face of the plate 10 and terminating short of the rear ends of the sides 17 as is clearly shown in the drawings. It should also be noted that the bottom face of the raised part 18 is parallel with the cutting edges 19 of the sides 17, forming the blades for producing a triangular cut in the can.

In the use of the device, the tool is grasped in one hand and the can with the other, and then the piercing member 14 and the point or piercing member 16 are brought into engagement with the can end or top. By exerting pressure thereon the piercing member or tapered conical projection 14 and the point 16, will be forced through the bottom of the can at diametrically opposite sides thereof near the lateral section or wall of of the can and by continuing to exert pressure thereon, the blades 17 will continue the opening formed by the point 16 while the projecting part or intermediate wall 18 between the blades will force the metal between the cut downwardly. This will result in the tapered projection or piercing member 14 producing an air inlet opening or vent 20 and in the opposite cutting member producing a V-shaped cut or opening 21 with the sides thereof corresponding in angular relation to the angular relation of the blades 17 to each other. Owing to the provision of the point 16, the triangular opening will be started and as the blades continue the cut therefrom, tearing of the metal will be prevented and owing to the fact that the stamped out portion will be depressed or bent downwardly, a tongue or flap 22 will thus be provided so as to form a deflector preventing the contents from pouring out through the opening in the can, except by approaching the opening from the side or at the apex or narrow portion thereof. In this manner, the contents will be caused to pour as from a spout, thereby obviating spilling of the contents and insuring that the can shall be entirely emptied. It is also obvious that the puncturing operation is accomplished with a single pressure upon the tool or instrument, and by keeping the instrument in a clean and sanitary condition, contamination of the contents of the can will be prevented. This will discourage the haphazard use of any nail or piercing member, as is now commonly done and which permits the puncturing of a can with difficulty.

What is claimed is:

1. A kitchen utensil for puncturing the ends of cans containing evaporated milk or the like, comprising a plate having a pointed projection upon one face, and in alinement therewith, and an enveloping blade having an intermediate projecting portion to depress the portion of the can cut by the enveloping blade.

2. A culinary utensil of the class described, comprising a plate, a handle fixed to the plate at one side, a conical projection at the opposite side of the plate and a triangular blade on the same side and spaced therefrom, said blade having a pointed apex and an intermediate wall projecting from the face of the plate.

3. A can puncturer comprising a plate-like body, means for exerting pressure thereon, a conical pointed projection extending at right angles to the plate near one end, a triangular blade projecting from the plate near its opposite end and with the apex thereof pointed and located at a point remote from the conical projection, the sides of the angular blade decreasing in height toward the projection and a depressing block between the blades inclined similarly with respect thereto, whereby to simultaneously pierce the end of the can for producing an air vent opening and at a diametrically opposite point, cutting a V-shaped opening and depressing the tongue formed by the cut out.

4. A culinary utensil of the class described comprising a movable plate and a can cutting blade carried by the plate and comprising converging and meeting blade members and a puncturing projection at the meeting point of the members, and means disposed between the convergent blade members for depressing between said members the metal of a can as cut.

In testimony whereof I affix my signature, in the presence of two witnesses.

ALTER L. SCHWARTZBERG.

Witnesses:
R. H. HARGROVE,
W. B. WILLIAMS.